UNITED STATES PATENT OFFICE.

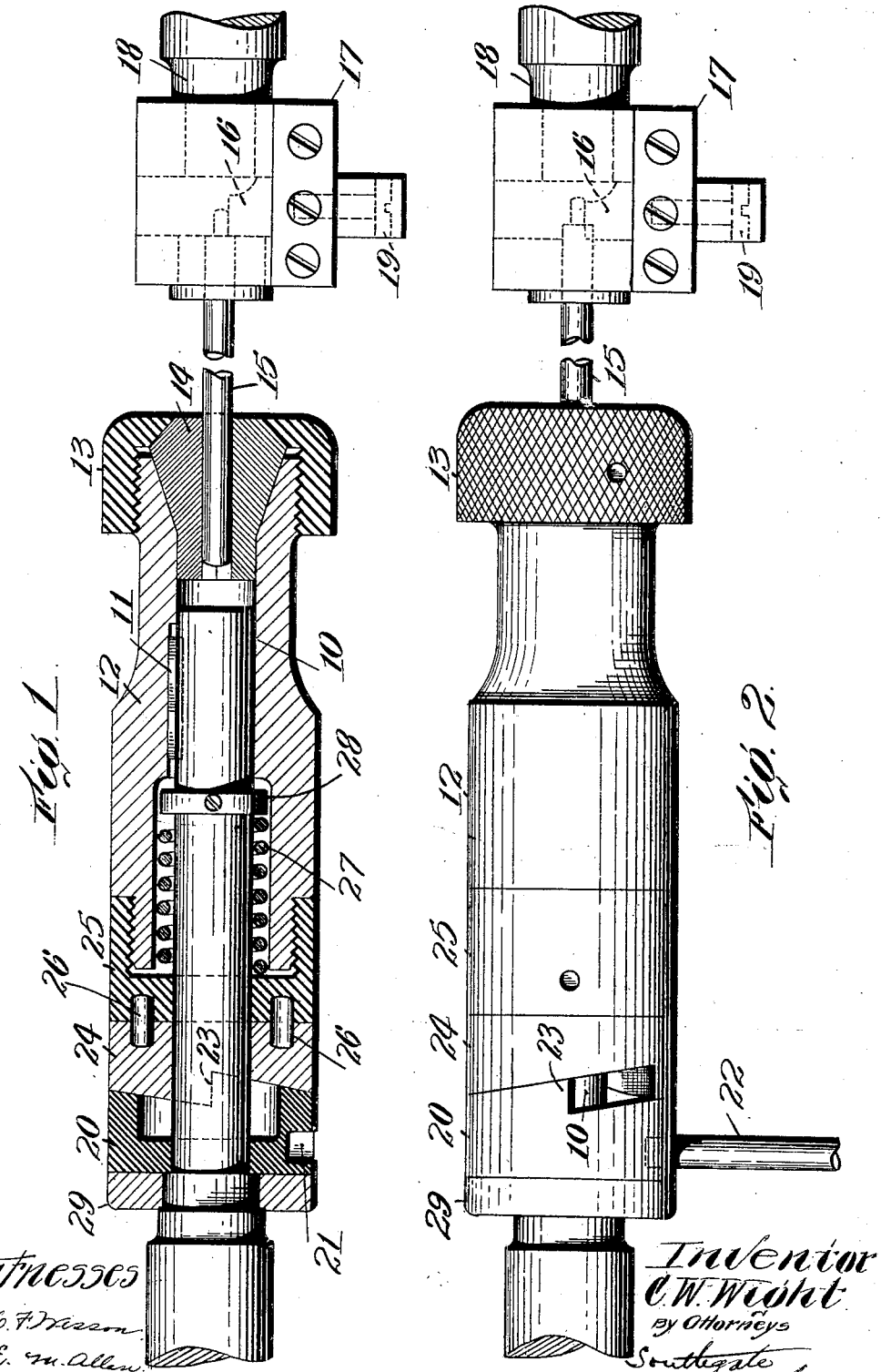

CHARLES W. WIGHT, OF WORCESTER, MASSACHUSETTS.

ATTACHMENT FOR LATHES.

No. 920,704.  Specification of Letters Patent.  Patented May 4, 1909.

Application filed May 14, 1907. Serial No. 373,530.

*To all whom it may concern:*

Be it known that I, CHARLES W. WIGHT, a citizen of the United States, residing at Worcester, in the county of Worcester and State of Massachusetts, have invented a new and useful Attachment for Lathes, of which the following is a specification.

This invention relates to an attachment for lathes for the purpose of relieving counter-bores.

The principal object of the invention is to provide a simple, compact and inexpensive device which can be attached to any ordinary lathe, even to a speed lathe, and which will operate simply by changing a cam to reciprocate the counter-bore any desired number of times to and from a stationary tool so as to relieve the several faces of the counter-bore. Although I have referred to the tool as a stationary one, it is to be understood that this word is used in a relative sense; that is, the tool is stationary during the cutting operation, and it is only fed up by hand or otherwise when it is desired to increase the depth of the cut.

Another object of the invention is to construct a device of this character which will have few parts, and which can be easily taken apart so as to change the cam and provide for operating on counter-bores having different numbers of cutting edges.

Further objects and advantages of the invention will appear hereinafter.

Reference is to be had to the accompanying drawings which illustrate one form of the tool as applied to a lathe, the ordinary parts of the lathe being omitted, and in which—

Figure 1 is a longitudinal sectional view of the same, and Fig. 2 is a side elevation.

The drawings show a bar 10 adapted to be fitted to the head spindle of a lathe and to rotate therewith. This bar is provided with a spline 11 on which is mounted a chuck-holder 12 so that the chuck-holder will rotate with the bar and can reciprocate during its rotation. This chuck holder is provided with a cap 13 holding a chuck 14 in a well known manner so as to grip a counter-bore 15 on which the operation is to be performed. The counter-bore is placed in such position that it can be operated upon by a tool 16 mounted in a stationary holder 17 in such a manner that the tool may be adjustable to follow up and increase the depth of the cut. The tool holder 17 is adapted to be fitted to the tail-stock 18 of the lathe. The tool is shown as being adjusted by means of a screw 19.

In order to provide for the reciprocation of the counter-bore during the rotation of the bar and chuck-holder, a cam 20 is rotatably mounted on the bar 10. This cam is provided with a socket 21 in which is adapted to be fitted a rod 22 which may bear against any stationary part of the bed of the lathe to hold the cam in stationary position. When this is done, the rotation of the bar 10 results in the reciprocation of the chuck-holder and the counter-bore any desired number of times during each revolution. If the counter-bore has two cutting edges, the cam will be provided with two offsets 23 as indicated. When a counter-bore having a different number of cutting edges is employed, the cam may be removed and another substituted for it having a similar number of offsets. The cam is shown as bearing on a collar 29 rotatably mounted on a shoulder on the bar 10.

In the form of the invention illustrated, the cam transmits motion to the chuck-holder through a second cam 24 mounted on the bar 10 and removably connected with the cap 25 by means of pins 26. The cap 25 is adapted to be screwed on to the end of the chuck-holder. In order to provide for returning the chuck-holder after each operation of the cam it is made hollow, and the hollow portion contains a spring 27 bearing against the cap 25 at one end and against a collar 28 fixed on the bar at the other end. The manner in which the cam 20 causes the parts 24, 25 and 12 to reciprocate two or more times during each revolution will be obvious. When it is desired to dismantle the device in order to apply a cam having a different number of offsets, the cap 25 which is provided with spanner holes for this purpose, or any other means of an equivalent nature, is unscrewed from the chuck-holder 12, it being understood that the screw thread is left-handed. Then the collar 28 is removed and the parts 20, 24 and 25 can be drawn off the end of the bar. When the device is constructed with two cams 20 and 24 as indicated, both of these parts are replaced by others for each change which is to be made. The degree of the angle on the cams will of course be regulated by the amount of relief which is to be given to the counter-bore and by the number of cutting edges thereof.

It will be seen that by constructing an attachment of this kind in accordance with the principles set forth, a very simple arrangement is secured which can be applied to any kind of a lathe or similar machine, and which can readily be taken apart to change the cams.

While I have illustrated and described a particular form of the invention, I am aware that many modifications may be made therein by persons skilled in the part without departing from the scope of the invention as expressed in the claims. I do not wish, therefore, to be limited to the particular form of the invention shown.

What I do claim is:—

1. An attachment for lathes comprising a bar adapted to be fitted to the head-spindle, a cam mounted on said bar, a chuck holder longitudinally movable on said bar and rotatable therewith, said cam being adapted to reciprocate the chuck-holder when the bar is rotated and the cam held stationary, and means whereby the cam may be held in stationary position.

2. An attachment for lathes comprising a bar adapted to be fitted to the head-spindle, a pair of cams fitting each other and mounted on said bar, a chuck holder secured to one of said cams and splined to the bar, whereby it is longitudinally movable on the bar, the other of said cams being loose on the shaft and being adapted to be held in stationary position, whereby it will reciprocate the other cam and chuck holder during their revolution.

3. An attachment for lathes for relieving counter-bores comprising a bar adapted to be fitted to the head-spindle, a cam loosely mounted thereon, a chuck-holder splined and longitudinally movable on the bar, means connected with said chuck holder for reengaging the cam, and a rod adapted to be applied to said cam to prevent the rotation thereof while the bar is rotated.

4. An attachment for lathes for relieving counter-bores, comprising a bar adapted to be fitted to the head-spindle, a cam rotatably mounted on said bar, a chuck-holder splined and reciprocatable on said bar, a chuck mounted in the holder and adapted to hold a counter-bore, means for holding said cam stationary while the bar rotates, and a stationary tool-holder adapted to coöperate with the chuck.

5. In a device of the character described, the combination of a rotatable bar, a chuck holder rotatable therewith and reciprocatable thereon, said chuck-holder being hollow, a collar fixed to the bar in said chuck-holder, a spring engaging the collar, a cap on the chuck holder against which the spring engages, and a pair of cams loosely mounted on the bar, one of said cams being connected with said cap to rotate therewith, and the other adapted to be held in stationary position.

6. In a lathe, the combination with a bar adapted to be fitted to the head spindle of the lathe, a tool held in stationary position, a chuck for holding the work adjacent to the tool and adapted to be rotated by the bar, means connected with said bar for holding the chuck, and an element rotatable independent of the bar on the same axis and adapted to be held in stationary position while said bar rotates, having means thereon for engaging and reciprocating said chuck holding means a predetermined number of times during each revolution thereof when said element is held in stationary position.

7. In an attachment for lathes, the combination of a chuck for holding the work, means for holding the chuck and rotating the same with the head-spindle of the lathe, means loosely mounted with respect to the chuck-holding means and rotatable with the chuck on the same axis, for engaging the chuck-holding means and reciprocating the chuck a predetermined number of times during each revolution thereof, and means for holding said rotatable means to prevent its rotation, said attachment being bodily removable as a whole from the lathe.

In testimony whereof I have hereunto set my hand, in the presence of two subscribing witnesses.

CHARLES W. WIGHT.

Witnesses:
ALBERT E. FAY,
WILLIAM A. WARDEN.